UNITED STATES PATENT OFFICE.

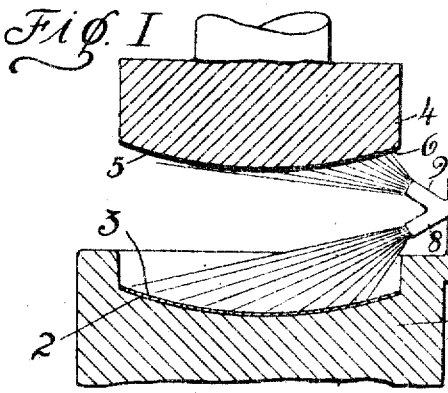
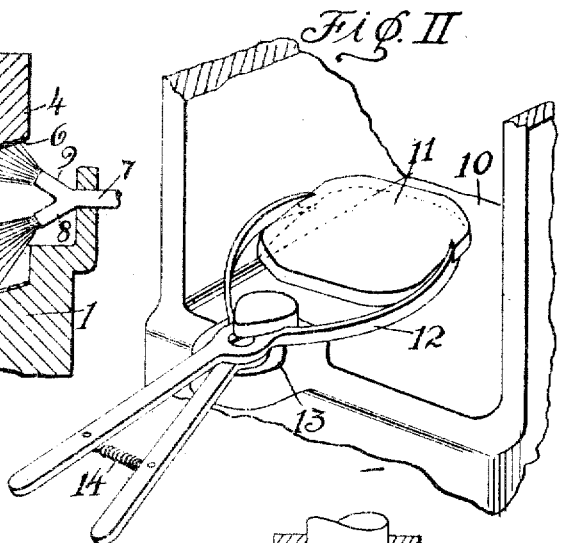
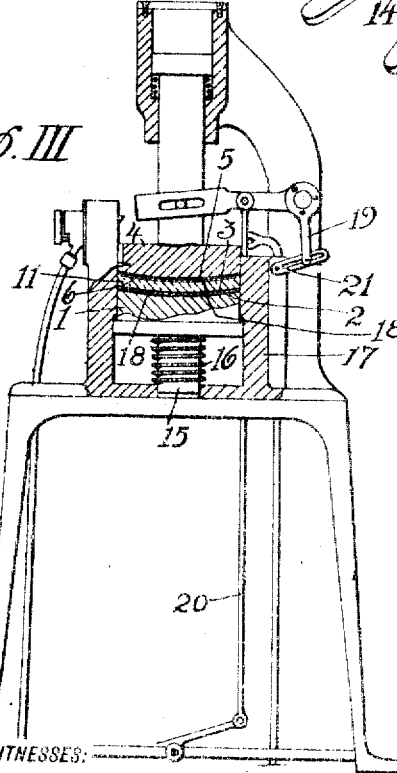
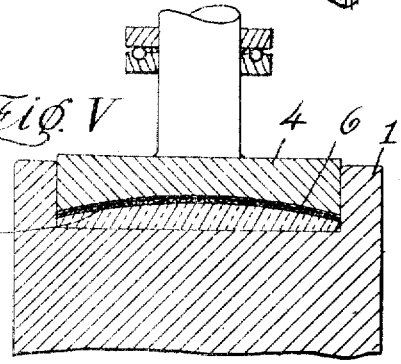

EDGAR D. TILLYER AND HARRY H. STYLL, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

PROCESS OF MOLDING LENSES.

1,308,820.  Specification of Letters Patent.  Patented July 8, 1919.

Application filed September 6, 1916. Serial No. 118,773.

*To all whom it may concern:*

Be it known that we, EDGAR D. TILLYER and HARRY H. STYLL, citizens of the United States, residing at Southbridge, in the county of Worcester and State of Massachusetts, have invented certain new and useful Improvements in Processes of Molding Lenses, of which the following is a specification.

This invention relates to improvements in method of manufacturing ophthalmic lenses, and has for its leading object the provision of an improved simplified method of so molding or shaping ophthalmic lenses that at least one of the molded surfaces shall possess a sufficient polish to be commercially usable as a lens without subsequent grinding or other operations thereon.

A further object of the invention is the provision of an improved method by which a single completely formed lens may be manufactured entirely by molding if desired, or by which a plurality of lenses may be manufactured in semi-finished form if preferred.

A further object of the invention is the provision of improved mechanism for carrying out our novel method of constructing ophthalmic lenses.

Other objects and advantages of our improved method of and apparatus for constructing ophthalmic lenses should be readily apparent by reference to the following specification taken in connection with the accompanying drawings, and it will be understood that we may make any variations in the several steps of the process or in the machinery for carrying out the process, within the scope of the appended claims without in any wise departing from or exceeding the spirit of our invention.

Figure I represents a fragmentary semi-diagrammatic illustration of one step in the manufacture of the lens.

Fig. II represents a view of the blank heating and transferring means.

Fig. III represents a vertical sectional view illustrating one form of machine, which may be employed in the carrying out of our invention.

Fig. IV represents an enlarged detail view of the air controlling valve.

Fig. V represents a view of a spinning mold.

Referring especially to our novel process or method of forming ophthalmic lenses by molding: We are aware that prior to our invention it has been customary to mold lumps or disks of glass into substantially the shape of a finished lens, but hitherto these blanks have always had a rough, somewhat pitted surface as brought from the mold, as a result of their contact with the mold, and consequently have not been usable without subsequent grinding. We further understand that prior to our present invention attempts have been made to polish lenses and then bend the same under influence of heat to vary the curve or shape of the lens blank. This likewise has been attended with considerable disadvantages, since the lenses so produced while in some instances due to the use of exceptional care in their construction may have proved usable, have almost universally been rendered unfit for use as a first class satisfactory lens, due to the fact that contact with the mold always to a greater or less degree injured the polished surface so that the surface was no longer a true lens surface, but was substantially impaired to render its use before the eye an unsatisfactory if not dangerous procedure, while on account of the difficulties attendant upon its even semi-successful operation, lenses could not be commercially produced in accordance with this process.

By the use of our present process, however, and by the interposition of a cushion or film of vapor between the face of the mold and the surface of the lens, the surface of the lens is in nowise injured or distorted by contact with the mold, but a fire polished surface produced which is perfectly satisfactory for a surface of an ophthalmic lens, and in all essential respects equal to a specially ground and polished lens surface.

In order that the carrying out of our process may be better understood we have designed and herewith illustrated certain mechanism for the carrying out of the process, it being understood, however, that the process is entirely independent of the particular machinery here illustrated, since we realize that other machinery or apparatus could be employed with equally satisfactory results, and the essential invention residing in the appreciation of the fact that a satisfactory surface could be produced on an ophthalmic lens by molding and in the process of production of this surface.

Referring to the apparatus for carrying out our process, as illustrated in the drawings, and in which similar characters of reference are employed to denote corresponding parts throughout the views, the numeral 1 designates a base mold section which has an upper surface 2 of the desired curve to be produced on the lens, said surface 2 being suitably coated with a thin layer of asbestos or other suitable absorbent material 3 having its inner face shaped to the exact curve to be produced on the lens. Disposed above the mold section 1 we have shown the plunger 4, which if desired may have the second curved surface 5 with the coating 6 to engage and shape the upper face of the lens.

It will be understood, however, that if desired we may employ merely the lower mold 1 without the plunger 4, allowing the lens to set down onto the mold by its own weight in place of being pressed thereagainst. In either event we have shown as disposed at the side of the mold and plunger the liquid supply pipe 7 having the spray nozzles 8 and 9 directed respectively toward the absorbent coatings 3 and 6 of the mold 1 and plunger 4, whereby these coatings may be readily sprayed to saturate the same with suitable moisture of water, oil or the like, as may be preferred. It will be understood, however, that in the carrying out of our process it is not necessary to employ the spray nozzles, since the absorbent coatings may be moistened by the use of a sponge, brush or in any other suitable manner.

In the further carrying out of our process the lens is suitably heated, as by being placed within the furnace or heater 10. In the event that it is desired to change the shape of a lens already ground and polished, as the lens blank 11 shown in Fig. II for example, the blank in place of being rested in the oven or heater with its polished surface in contact with the floor or grating of the oven, may be suspended as by the tongs 12 engaging the edges of the lenses and held on a suitable rest 13, a spring 14 holding the jaws of the tongs in clamping engagement with the edges of the lens. In this manner the lens is heated and after being heated is moved by the tongs and placed upon the mold 1, being then if desired engaged by the plunger 4 to firmly press the lens down against the mold and shape the upper surface of the lens, as should be best understood by reference to Fig. III.

Attention is here invited to the fact that in Fig. III the mold 1 is shown as having the depending stem 15 surrounded by the spring 16, allowing the mold to yield downward within the tubular casing or shell 17 which serves to engage the edges of the lens blank 11 to prevent spreading thereof under the pressure of the plunger 4 so that the upper and lower surfaces of the lens will both have the desired curve, while upon raising of the plunger 4 the spring 16 will shift the mold upward to bring the lens above the shell 17.

It is to be understood that in the carrying out of our process, the absorbent coating of the mold and of the plunger, in the event that both mold and plunger are employed, are suitably saturated. When the spray nozzles are employed for this purpose the coatings may if desired be saturated with steam, thus raising the temperature of the mold nearer that of the glass so there will be less liability of cracking or strain on the blank on account of the heated plastic blank being suddenly brought into contact with the cold mold or a heated oil may be used for the saturation. In any event, the absorbent surfaces having been saturated the blank is placed in position and if a plunger is used the plunger 4 is brought down, as illustrated in Fig. III, in which the mold has been pushed downward by the blank and plunger within the shell 17 which engages the side walls of the blank to limit its spreading movement and insure the proper thickness and upper and lower curves of the blank. In Fig. III the action of our improved process has been exaggerated for purposes of illustration. By reference to this figure it will be noted that between the surface 3 and the lens blank 11 and between the surface 6 and the lens blank 11 is a cushion of vapor 18, which it is true in actual practice will be so thin as to be imperceptible, but which at the same time will place a thin film or covering between the surfaces 3 and 6 and the faces of the lens, this vapor being generated by the approach of the hot blank 11 to the surfaces, and continuing to be generated until the surfaces have been so cooled that they will no longer be in any wise injured by contact with the absorbent coatings 3 and 6.

It will be appreciated, however, that inasmuch as the vapor films conform exactly to the curve or shape of the absorbent surfaces from which they rise, that the lens blank will be properly molded to the exact desired curve and at the same time will acquire what may be termed a fire polish, or in other words, a high glazed polish suitable for optical purposes.

It will be noted in connection with Fig. III that we have shown a treadle or the like coupled to actuate the plunger 4 while there is an operating arm 19 associated with the main treadle 20 in such manner that pressure of the foot on the treadle to depress the plunger will serve to temporarily open the controlling valve 21 for the spray supply lines and temporarily spray the surfaces 3 and 6.

Likewise, as the plunger is raised, and in order to insure substantially uniform cooling of the lens blank as it is raised upward by the action of the spring 16 on the mold 1, we have placed on the shell 17 the blower nozzle or nozzles 22 controlled by the valve 23 and adapted to project a current or blast of air across the lens to suitably cool same. This blast is controlled by the valve handle 24 having pivoted thereto the latch end 25 engaged by the pin 26 on the plunger as the plunger rises to temporarily open the valve and allow it to slip off the pin 26 and close before the plunger reaches its upper limit of movement, the pivotal connection between the valve handle 24 and member 25 being such that the plunger will swing the member downward on its pivot upon depression of the plunger without actuating the air spray, a spring 27 returning it to raised position where it will be engaged by the pin on the plunger on upward movement of the plunger.

In Fig. V we have illustrated one modification of our process, in which the plunger member 4 is suitably rotatably mounted and driven with a spinning movement so that the lens is placed on the mold or support 1' and the spinning plunger with saturated absorbent surface 6 brought down onto the lens spinning around over it to insure correct shaping of its upper exposed surface.

From the foregoing description taken in connection with the accompanying drawings, the generic features of our improved process should be readily apparent, and it will be seen that broadly speaking the process consists in the suitable preparation of a mold having an absorbent surface or surfaces which may be adapted to give off a steam or like protecting vapor to form a film protecting the surface from contact on bringing of a heated lens blank into proximity thereto, in suitably heating the lens blank and placing the blank above the mold and in causing the blank to conform to the shape of the mold, either by its own weight as it is placed thereon in heated plastic condition, or by the application of pressure thereto, or, if preferred, by making the mold in such shape that the lens may be blown from molten glass directly against the mold surface, the essential features in any event being the heating or bringing of the lens blank to a plastic condition and the placing of the plastic glass in such relation to a vapor protected mold that the glass will receive the shape of the mold and at the same time have a fire polished surface or its own polished surface preserved on account of the protecting vapor, preventing actual contact between the surface of the lens and the surface of the mold, while the lens surface is in plastic or impression receiving condition.

We claim:

1. The process of forming an ophthalmic lens, consisting in heating the glass stock, preparing molding surfaces therefor by moistening the surfaces, placing the glass stock between the surfaces while in heated condition, bringing the moistened surfaces toward the glass whereby a cushioning film is provided preserving the fire polish of the glass while shaping the stock to correspond with the shape of the mold, withdrawing the shaping pressure and projecting an air blast on the molded lens.

2. The process of forming an ophthalmic lens, consisting in heating the glass stock, bringing the glass stock and a mold into close proximity one with the other, producing a vapor film between the adjacent surfaces of the mold and glass stock, withdrawing the shaping pressure and projecting an air blast on the molded lens.

In testimony whereof we affix our signatures in the presence of two witnesses.

EDGAR D. TILLYER.
HARRY H. STYLL.

Witnesses:
H. K. PARSONS,
EDITH M. HALVORSEN.